US006708209B1

United States Patent
Ebata et al.

(10) Patent No.: US 6,708,209 B1
(45) Date of Patent: Mar. 16, 2004

(54) NETWORK SYSTEM HAVING PLURAL NETWORKS FOR PERFORMING QUALITY GUARANTEE AMONG THE NETWORKS HAVING DIFFERENT POLICIES

(75) Inventors: Tomoichi Ebata, Sagamihara (JP); Shigeru Miyake, Tokyo (JP); Masatoshi Takihiro, Yokohama (JP); Osamu Takada, Sagamihara (JP); Minoru Koizumi, Yokohama (JP); Yoshiyuki Kurosaki, Fujisawa (JP); Toshiaki Hirata, Kashiwa (JP); Koji Tsukada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/520,832

(22) Filed: Mar. 8, 2000

(30) Foreign Application Priority Data

Oct. 5, 1999 (JP) .......................... 11-284862

(51) Int. Cl.⁷ .......................................... G06F 13/100
(52) U.S. Cl. ...................... 709/223; 709/229; 370/220; 370/235
(58) Field of Search ............................. 709/224, 223, 709/226, 232, 229, 230; 370/235, 220

(56) References Cited

U.S. PATENT DOCUMENTS

| 5,831,972 A | * 11/1998 | Chen ......................... 370/230 |
| 5,884,037 A | 3/1999 | Aras et al. ................... 709/226 |
| 6,021,263 A | 2/2000 | Kujoory et al. ............. 709/232 |
| 6,038,214 A | 3/2000 | Shionozaki ................. 370/230 |
| 6,041,354 A | 3/2000 | Bilris et al. ................. 709/226 |
| 6,058,113 A | 5/2000 | Chang ......................... 370/390 |
| 6,092,113 A | 7/2000 | Maeshima et al. .......... 709/230 |
| 6,098,099 A | 8/2000 | Ellesson et al. ............. 709/223 |
| 6,101,549 A | 8/2000 | Baugher et al. ............. 709/238 |
| 6,104,700 A | 8/2000 | Haddock et al. ............ 370/235 |
| 6,278,712 B1 | 8/2001 | Takihiro et al. ............. 370/400 |
| 6,286,052 B1 | 9/2001 | McCloghrie et al. ....... 709/238 |

FOREIGN PATENT DOCUMENTS

WO  WO 99/11003  * 3/1999 ............. H04J/3/14

OTHER PUBLICATIONS

Braun, T; Gunter, M; Kasumi, M; and Khalil, I. "Virtual Private Network Architecture." Technical Report of the Institute of Computer Science and Applied Mathematics. pp. 1–31.*

(List continued on next page.)

*Primary Examiner*—David Wiley
*Assistant Examiner*—Alina Boutah
(74) *Attorney, Agent, or Firm*—Antonelli, Terry, Stout & Kraus, LLP

(57) ABSTRACT

A network system having a plurality of interconnected networks each having a policy server. The policy server sets a quality-guaranteed path in the network according to a policy held in the policy server. The policy server includes: a policy holding unit to hold a policy defining a quality that can be guaranteed in its own network, or local network, for an inter-network communication; a policy publicizing unit to make public the policy held in the policy holding unit to the policy servers of other networks; a guaranteed quality calculation unit to calculate, from a policy publicized by a policy server of a network on a path between the local network and other network, a quality that can be guaranteed for the path between the local network and the other network; and a quality-guaranteed path setting unit to provide a quality-guaranteed path, the quality-guaranteed path having a guaranteed quality within the quality calculated by the guaranteed quality calculation unit for the path between the local network and the other network.

16 Claims, 18 Drawing Sheets

OTHER PUBLICATIONS

Blight, D; and Hamada, T. "Policy–Based Networking Architecture for QoS Interworking in IP Management." Fujitsu Laboratories Expressway, Sunnyval, CA. May, 1999. pp. 813–826.*

"Quality of Service in Entreprise Networks." Extreme Networks, 1999. pp. 2/1–2/4.*

U.S. application Ser. No. 09/513,930, filed Feb. 28, 2000, by S. Mayake et al.

"The COSP (Common Open Policy Service) Protocol" by J. Bagle et al, Internet Draft IETF, pp. 1–5, Nov. 6, 1999.

"A Framework for Policy–based Admission Control", by R. Yavatkar et al, Internet Draft IETF, pp. 1–3, Apr. 1999.

"Quality of Service Policy Information Base" by M. Fine et al, Internet Draft IETF, pp. 1–5, Oct. 12, 1999.

"Internet Protocol, DARPA Internet Program, Protocol Specification", (RFC 791), by J. Postel, Networking Group, IETF, pp. 1–5, Sep. 1981.

Resource Reservation Protocol (RFC 2205), by R. Braden et al, Networking Group, IETF, pp. 1–7, Sep. 1997.

"Definition of the Differentiated Services Field (DS Field) in the IPv4 and the IPv6 Headers", (RFC 2474), by K. Nichols et al, Networking Group, IETF, pp. 1–4, Dec. 1998.

"An Architecture for Differentiated Services", (RFC 2475), by S. Blake et al, Networking Group, IETF, pp. 1–6, Dec. 1998.

"Internet Official Protocol Standards", (RFC 2500), by J. Reynolds et al, Networking Group IETF, pp. 1–7, Jun. 1999.

T. Braun, et al "Virtual Private Network Architecture" Technical Report of the Institute of Computer Science and Applied Mathematics Uni. Bern, Online! Apr. 1999, pp. 1–31.

R. Neilson, "A Discussion of Bandwidth Broker Requirements for Internet2 Qbone Deployment", IEEE Internet Draft, XX, XX, Aug. 1999, pp. 1–30.

D. Blight, et al "Policy–based Networking Architecture for QoS Interworking in IP Management–scalable Architecture for Large–scale Enterprise–Public Interoperation", Internet2 Qbone BB Advisory Council, May 1999, pp. 814–826.

Boyle, et al, "The Cops (Common Open Policy Service) Protocol" IEEE Internet Draft, Aug. 1999, pp. 27–30.

* cited by examiner

FIG.4

| ORGAN-IZATION NAME | ORGAN-IZATION ID | PS IP ADDRESS | BR NAME | BR IP (INCOMING) | BR IP (OUTGOING) |
|---|---|---|---|---|---|
| ORGAN-IZATION A | 64512 | 172.16.12.1/24 | BRa1 | 172.16.12.20/24<br>172.16.12.21/24 | 172.30.0.1/24 |
| | | | BRa2 | 172.16.12.22/24<br>172.16.12.23/24 | 172.30.1.1/24<br>172.30.1.3/24 |
| ORGAN-IZATION B | 64513 | 172.16.13.1/24 | BRb1 | 172.16.13.30/24 | 172.30.1.5/24 |
| | | | BRb2 | 172.16.13.31/24 | 172.30.1.2/24<br>172.30.2.4/24 |
| ORGAN-IZATION C | 64514 | 172.16.14.1/24 | BRc1 | 172.16.14.16/24<br>172.16.14.17/24 | 172.30.0.2/24 |
| | | | BRc2 | 172.16.14.11/24 | 172.30.1.4/24<br>172.30.1.6/24 |
| ORGAN-IZATION D | 64515 | 172.16.15.1/24 | BRd1 | 172.16.15.10/24<br>172.16.15.11/24 | 172.30.2.5/24 |

Column labels: 50001, 50002, 50003, 50004, 50005, 50006

FIG.6

| (a) | (b) | (c) | (d-1) | (d-2) | (e) | (f) | (g) |
|---|---|---|---|---|---|---|---|
| 84513 | 172.16.13.1/24 | 1 | 172.16.12.22/24<br>172.16.12.23/24 | 172.30.1.3/24 | 172.30.1.5/24 | 3.4M | 5.6M |
| 64514 | 172.16.14.1/24 | 2 | 172.16.12.20/24<br>172.16.12.21/24 | 172.30.0.1/24 | 172.30.0.2/24 | 10M | 5.2M |
| 64514 | 172.16.14.1/24 | 3 | 172.16.12.22/24<br>172.16.12.23/24 | 172.30.1.1/24 | 172.30.1.4/24 | 5.6M | 3.3M |

Columns: 50101, 50102, 50103, 50104, 50105, 50106, 50107, 50108

FIG.7

| (a) | (b) |
|---|---|
| 1 | 64513 |
| 2 | 64514 |
| 3 | 64514 |

Columns: 50301, 50302

FIG.8

| (a) | (b) | (c-1) | (c-2) | (d) |
|---|---|---|---|---|
| 172.16.12.100/24 | 2 | 5.3 | 2.6 | 64513,64514,64515 |
| | 3 | 5.3 | 2.3 | |
| | 1 | 3.5 | 1.7 | |
| 172.16.12.101/24 | 2 | 2.4 | 1.2 | 64515 |
| | 3 | 2.4 | 1.2 | |
| | 1 | 2.4 | 1.2 | |
| 172.16.12.102/24 | 2 | 2.4 | 1.2 | 64514,64515 |
| | 3 | 2.4 | 1.2 | |
| | 1 | 2.4 | 1.2 | |
| 172.30.1.3/24 | 1 | — | — | |
| | 2 | 3.5 | 1.7 | |
| | 3 | 3.5 | 1.7 | |
| 172.30.0.2/24 | 1 | 3.5 | 1.7 | |
| | 2 | — | — | |
| | 3 | 5.6 | 2.5 | |
| 172.30.1.1/24 | 1 | 3.5 | 1.7 | |
| | 2 | 5.6 | 2.5 | |
| | 3 | — | — | |

| (a) | (b) |
|---|---|
| 1 | 64514 |
| 2 | 64515 |

FIG.11

| (a) | (b) |
|---|---|
| 1 | 64513,64515 |

FIG.12

| (a) | (b) |
|---|---|
| 1 | 64513,64514 |

FIG.13

| (a) | (b) |
|---|---|
| 1 | 64513,64514,64515 |
| 2 | 64514,64513,64515 |
| 3 | 64514,64513,64515 |

FIG.16

| (a) | (b) | (c) | (d) | (e) | (f) | (g) | (h) |
|---|---|---|---|---|---|---|---|
| 192.16.12.100/24 | 64512 | 2700 | — | 172.16.15.10/24 | 172.30.2.5/24 | 64513 | XXXX |
| | | 1300 | — | 172.16.15.10/24 | 172.30.2.5/24 | 64513,64514 | XXXX |
| | | 5300 | — | 172.16.15.10/24 | 172.30.2.5/24 | 64513,64514 | XXXX |

| | | |
|---|---|---|
| 50510 — NUMBER OF ORGANIZATIONS MADE PUBLIC (16bit) | ORGANIZATION ID MADE PUBLIC | — 50511 |
| 50512 — ORGANIZATION IP MADE PUBLIC | | — 50513 |
| 10 — HOST IP | HOST IP NET MASK | — 11 |
| 50501 — AS-ID(16bit) | BR-IP NET MASK | — 50502 |
| BR-IP(v4) | | — 50503 |
| BAND UPPER LIMIT AVAILABLE FOR RESERVATION TYPE ALLOCATION (Kbit/s) | | — 50504 |
| BAND UPPER LIMIT AVAILABLE FOR IMMEDIATE TYPE ALLOCATION (Kbit/s) | | — 50505 |
| ⋮ | | |
| AS-ID(16bit) | BR-IP NET MASK | |
| BR-IP(v4) | | |
| BAND UPPER LIMIT AVAILABLE FOR RESERVATION TYPE ALLOCATION (Kbit/s) | | |
| BAND UPPER LIMIT AVAILABLE FOR IMMEDIATE TYPE ALLOCATION (Kbit/s) | | |

| 3 | 64513 |
|---|---|
| 64514 | 64515 |
| 172.16.12.100 | 24 |
| 64512 | 24 |
| 172.30.1.3 ||
| 3500 ||
| XXXXX ||

(b)

| 3 | 64513 |
|---|---|
| 64514 | 64515 |
| 172.16.12.100 | 24 |
| 64512 | 24 |
| 172.30.1.3 ||
| 3500 ||
| XXXXX ||
| 64513 | 24 |
| 172.30.2.4 ||
| 2700 ||
| XXXXX ||

50600

NETWORK SYSTEM HAVING PLURAL NETWORKS FOR PERFORMING QUALITY GUARANTEE AMONG THE NETWORKS HAVING DIFFERENT POLICIES

CROSS-REFERENCE TO RELATED APPLICATION

This application is related to U.S. application Ser. No. 09/513,930, filed on Feb. 28, 2000, the contents of which are incorporated herein by reference.

BACKGROUND OF THE INVENTION

The present invention relates to a path quality control technology in a network system comprising a plurality of networks.

For a network to transmit content requiring a real time capability, such as voice and video, while guaranteeing its real time capability, the network needs to perform a quality of service (QoS) control that allocates a bandwidth to each path on the network. Such a QoS control is known to be performed on an end-to-end basis according to the kind of traffic without causing any conflict in the entire network by using a policy server that manages quality control settings of network equipment in an integrated manner at one location. Such a policy server makes a quality control setting on each network equipment according to a described policy. Therefore, simply describing the policy of network operation, management and others in the policy server allows the network administrator to perform the QoS control, which gives priority to transmitting content requiring a real time capability, such as voice and video, assigning an absolute bandwidth, and processing important business applications, such as enterprise resource planning (ERP) and e-business applications.

At present, to realize this quality control using the policy server that does not rely on the network equipment vendors, the Internet Engineering Task Force (IETF), a standardization organization, is developing standards for the policy framework.

The policy server is capable of managing at one location in an integrated manner the quality controls of individual paths on the network but within a range of the network managed by that policy server. Hence, in a network system consisting of a plurality of networks each with its own policy server, the policy server-based QoS control cannot be performed on a path that extends over two or more networks. Nor is it possible to perform the QoS control in a way that does not violate the policies of the policy servers residing in the networks through which this path passes. If, however, an additional policy server that centrally manages the whole network system made up of a plurality of networks is provided, the QoS control may be applied also to the path extending to a plurality of networks in a way that conforms to a predetermined policy. Where the network system is large or its architecture is subject to frequent changes, the cost of installing and operating a policy server that performs such a non-distributed management will be enormous.

SUMMARY OF THE INVENTION

It is an object of the present invention to provide a network system which has a plurality of networks each having a policy server and which performs by using the policy server of each network the QoS control on a communication extending to two or more different networks.

To achieve the above objective, the present invention provides a network system which has a plurality of inter-connected networks each having a policy server, the policy server setting a quality-guaranteed path in the network according to a policy held in the policy server, the policy server comprising:

a policy holding means to hold a policy defining a quality that can be guaranteed in its own network, or local network, for an inter-network communication;

a policy publicizing means to make public the policy held in the policy holding means to the policy servers of other networks;

a guaranteed quality calculation means to calculate, from a policy publicized by a policy server of a network on a path between the local network and other network, a quality that can be guaranteed for the path between the local network and the other network; and a quality-guaranteed path setting means to provide a quality-guaranteed path, the quality-guaranteed path having a guaranteed quality within the quality calculated by the guaranteed quality calculation means for the path between the local network and the other network.

This network system can provide a quality-guaranteed path extending to a plurality of networks which has a quality guaranteed by, and not violating, the policies made public by the policy servers of a plurality of networks associated with the quality-guaranteed path to be provided. Therefore, in a network system having a plurality of networks each having a policy server, the QoS control can be performed on a communication extending to a plurality of networks by using the policy servers of the networks.

BRIEF DESCRIPTION OF THE DRAWINGS

The present invention will be more apparent from the following detailed description when taken in conjunction with the accompanying drawings, in which:

FIG. 4 is a diagram showing addresses of policy servers and border routers in the network system;

FIG. 6 is a diagram showing an inter-organization resource policy table;

FIG. 7 is a diagram showing an inter-organization link management table;

FIG. 8 is a diagram showing an intra-organization resource policy table;

FIG. 11 is a diagram showing an inter-organization link management table for a policy server of organization C;

FIG. 12 is a diagram showing an inter-organization link management table for a policy server of organization D;

FIG. 13 is a diagram showing an inter-organization link management table for a policy server of organization A;

FIG. 16 is a diagram showing an out-of-organization host policy table in a policy server of organization D;

FIG. 17 is a diagram showing a message format of QoS attribute;

FIG. 18 is a diagram showing how QoS attribute information is added;

DESCRIPTION OF THE EMBODIMENTS

Figure 1:
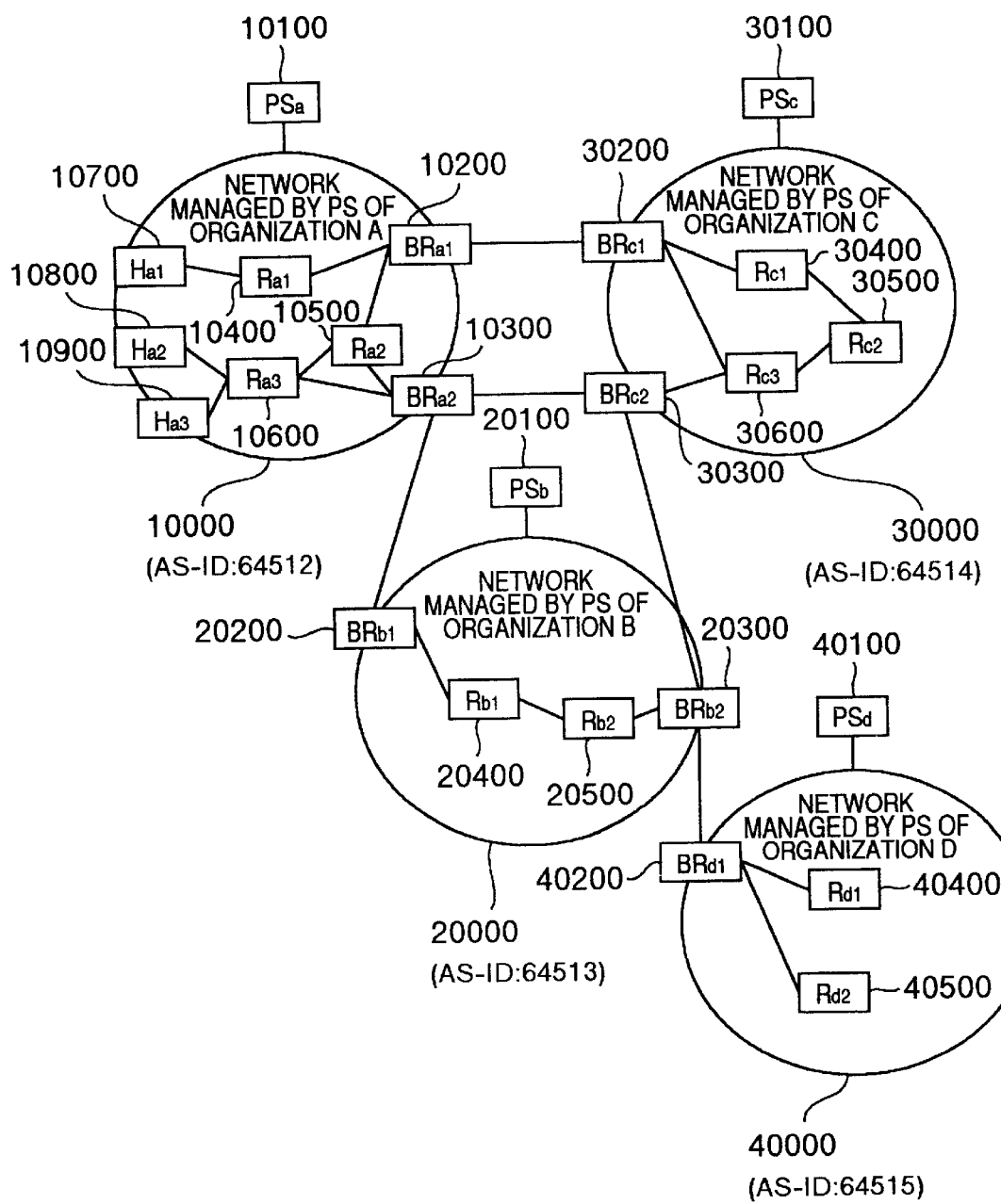
FIG. 1 is a block diagram showing an architecture of a network system.

FIG. 1 shows an architecture of a network system according to this embodiment.

In the figure, the network of each organization (organization A, B, C, D) has one policy server (PS) that manages network equipment (R: router, etc.) in the network according to a policy. Here, the network of each organization (organization A, B, C, D) is a range of network managed by a policy server having a certain policy. The network of each organization has one or more border routers (BR) to physically connect circuits to establish communication with other organizations' networks. The networks are interconnected via the border routers and communication circuits between the routers.

In the policy server of each organization there is a network administrator that operates and manages the policy server. The network administrator manipulates the user interface and others of the policy server to operate and manage the policy server. The policy server performs control and operation to provide a QoS guarantee service between end nodes within the same organization or between end nodes in a plurality of organizations.

Figure 2:
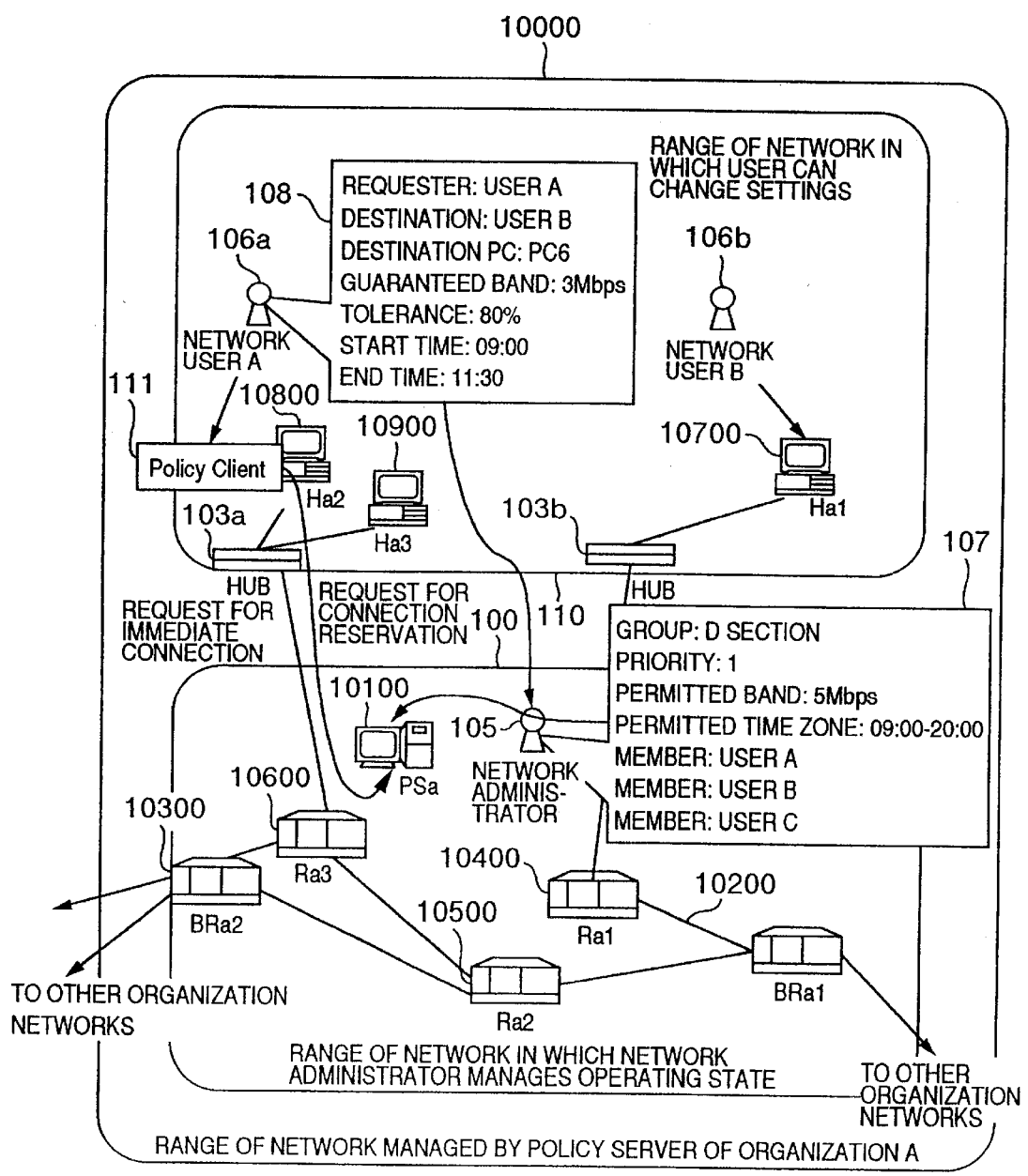
FIG. 2 is a block diagram showing an architecture of a network of each organization.

In the example shown, the network of organization A (10000) is a network managed by a policy server PSa (10100). The policy server PSa (10100) manages and controls network equipment in the organization A. Border routers BRa1 (10200) and BRa2 (10300) communicates with border routers of networks of organizations other than A. Routers Ra1 (10400), Ra2 (10500), Ra3 (10600) communicates with other routers and hosts Ha1 (10700), Ha2 (10800), Ha3 (10900) in the network of organization A. The similar processing is performed also by a policy server PSb (20100) of the network (20000) of organization B, by a policy server PSc (30100) of the network (30000) of organization C, and by a policy server PSd (40100) of the network (40000) of organization D. The network of each organization, as shown in FIG. 2 representing the organization A's network (10000), is a network system comprising a network of routers (S10200, 10300, 10400, 10500, 10600) and a network of end node PCs (personal computers) Ha1 (10700), Ha2 (10800), Ha3 (10900) connected to the routers via concentrators (HUB) (103a–103b). This network is connected to a policy server PSa (10100) that centrally manages and controls the network resource of each router.

The network administrator (105) generally manages the operating state of the network (100) of routers and modifies equipment settings in the router network as required. In the network (100) including the end nodes and the HUB equipment connected with the end nodes, the users (106a–106b) of the end nodes on the network can change the settings of the HUB equipment. That is, in the network as a whole there are a network (100) operated at the discretion of the network administrator and a network (110) used at end users' discretion.

The network administrator (105) registers with the policy server in advance a description (107) representing an operation policy on the network resource allocation. This allows requests to be checked against the policy server, the requests including asynchronously occurring user requests calling for immediate resource allocation and normal user requests to make reservations for resource allocation. The operation policy described by the network administrator comprises information necessary for network administration, which includes, for each group to be managed, group member information, priority, allocation condition of resource to be used, and limitation on path. The resource allocation request from the user has described therein the name of the user making the request, the IP address of the user's PC, conditions of necessary resource (108).

Figure 3:
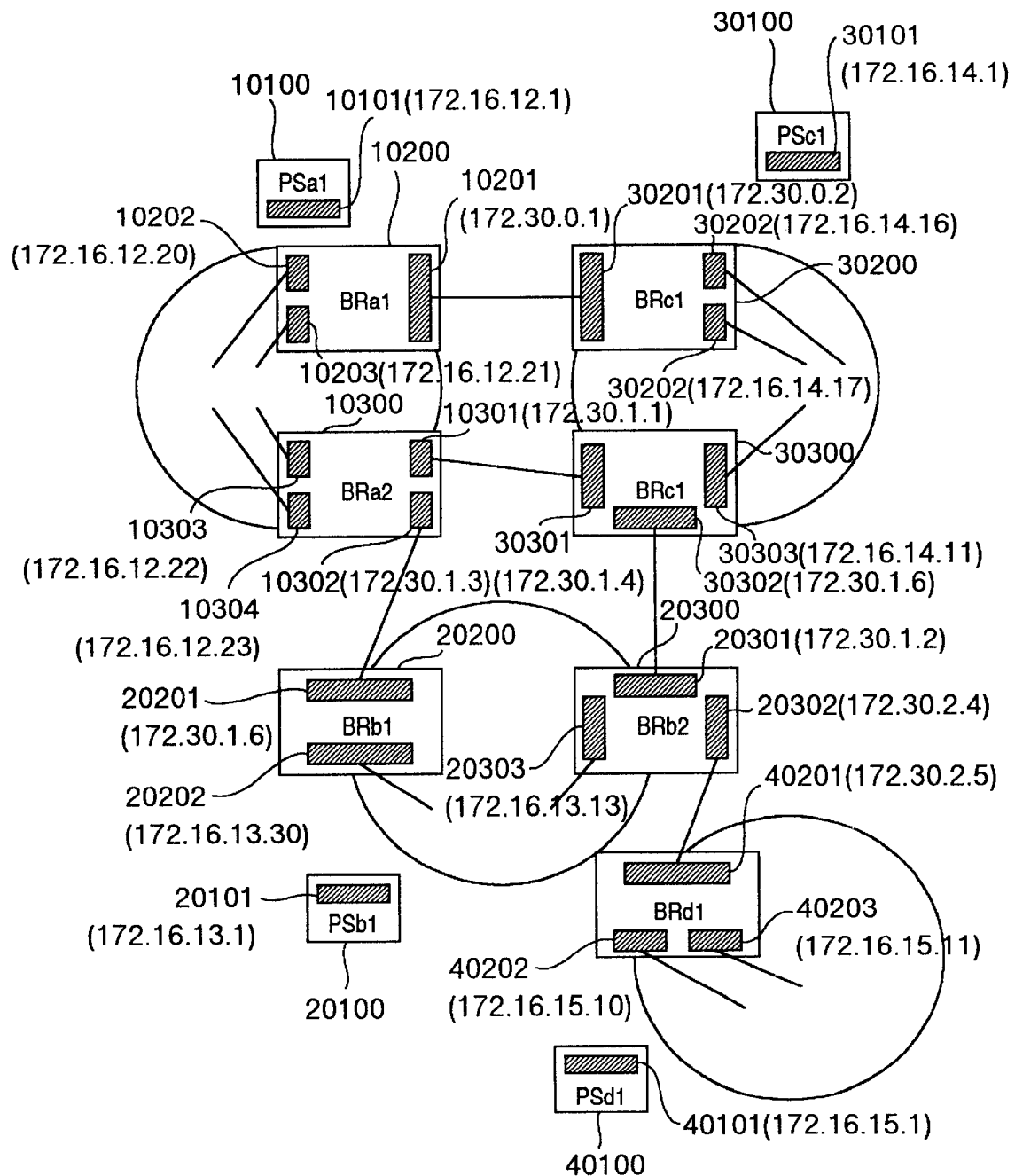
FIG. 3 is a diagram showing path interfaces of border routers of each network in the network system.

Next, the path interfaces of the border routers of each network in the network system of FIG. 1 are shown in FIG. 3. For simplicity of explanation, this embodiment assumes that each of the path interfaces is a receiving and sending interface and that the transfer speeds of transmission and reception are the same. The reception and transmission may be performed through separate interfaces and their transfer speeds may be different. As shown in the figure, border router BRa1 (10200) of organization A has a path interface (10201) to communicate with a boarder router BRc1 (30200) of organization C and interfaces (10202, 10203) for communication with routers within the organization. Another border router BRa2 (10300) of organization A has a path interface (10301) for communication with a border router BRc2 (30300) of organization C, a path interface (10302) for communication with a border router BRb1 (20200) of organization B, and interfaces (10303, 10304) for communication with routers within the organization. The same also applies to the organization B, organization C and organization D.

Identification numbers of organizations of FIG. 3 and addresses of policy servers and border routers are tabulated in FIG. 4.

In the figure, an organization name (50001) denotes the names of organizations. An organization ID (AS-ID) (50002) is an identification number of each organization. An AS is an abbreviation of an autonomous system which refers to a boarder router protocol BGP4. A PS-IP address (50003) is an IP address of a policy server managing each organization. A BR (50004) denotes names of border routers of each organization. A BR-IP (incoming to organization) (50005) is IP addresses of incoming path interfaces of the border routers in each organization. A BR-IP (outgoing from organization) (50006) is IP addresses of outgoing path interfaces of the border routers in each organization.

Figure 5:
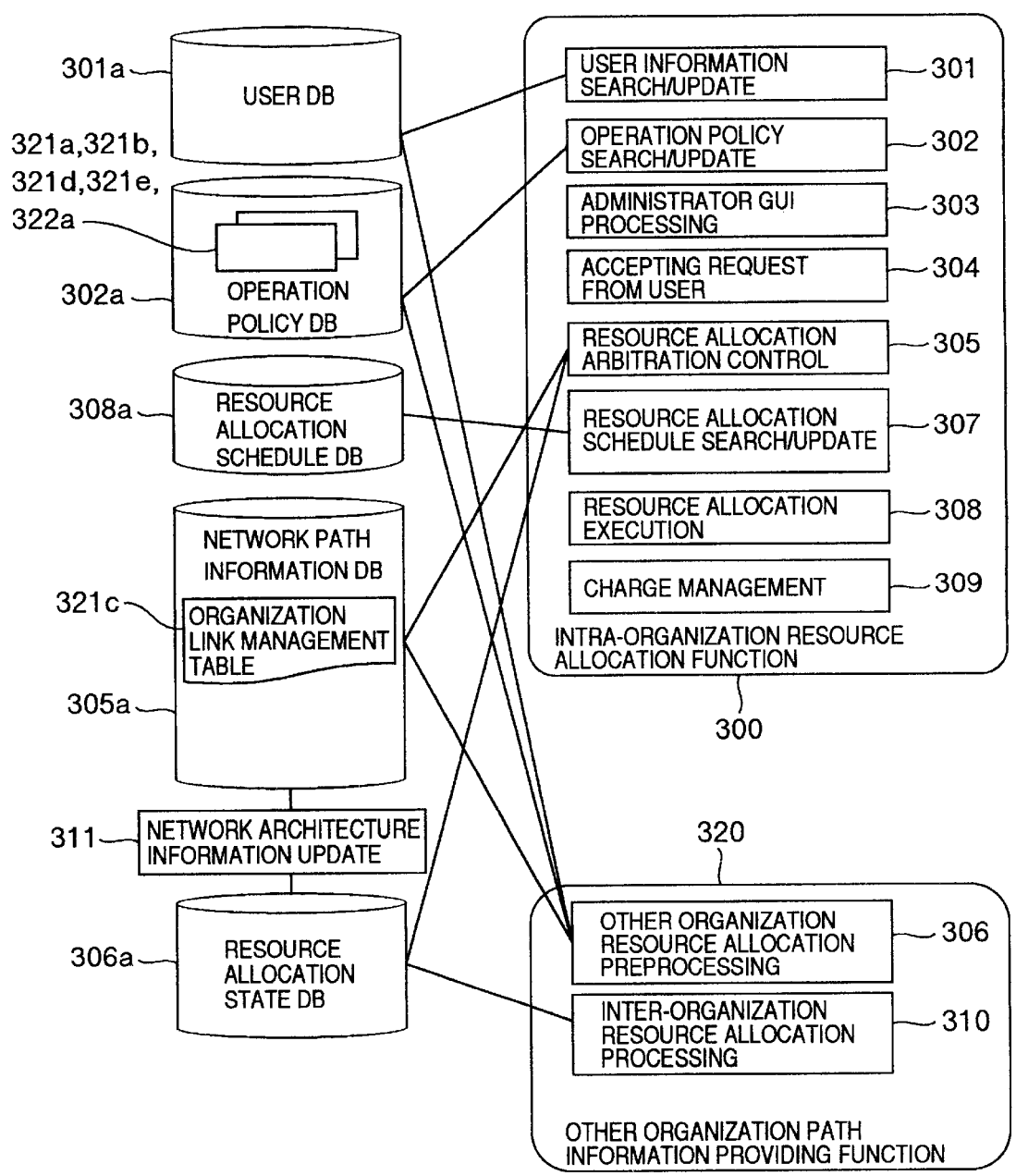
FIG. 5 is a block diagram showing a configuration of the policy server.

FIG. 5 shows the configuration of each policy server.

As shown in the figure, the policy server has an intra-organization resource allocation functional unit (300) that coordinates resource allocations within the organization according to its definition and an other organization path information providing functional unit (320) that informs a part of the operation policy of its organization to other organizations and, when it is necessary to secure a path for realizing the QoS guarantee service (herein called a QoS guarantee path) between it and other organizations, generates the QoS guarantee path between it and the other organizations.

The intra-organization resource allocation functional unit (300) includes: a customer management information search/update unit (301) for handling user information within its organization and a customer database (301a); an operation policy search/update unit (302) for reviewing and updating the operation policy described by the network administrator and an operation policy database (302a); an administrator GUI unit (303) for the administrator to input, update and maintain various settings; a request accepting unit (304) for accepting a network resource allocation request of reservation type and immediate type from the user or the network administrator; a resource allocation arbitration control unit (305) for coordinating the individual resource allocation requests according to the operation policy and determining the content of a resource allocation control; a network path information database (305a) used by the resource allocation arbitration control unit (305); a resource allocation status database (306a); and, when the requested resource allocation is not closed within the local organization, an other organization resource allocation request preprocessing unit (306) which performs preprocessing, described later, for making a resource allocation request to other organizations.

The intra-organization resource allocation functional unit (300) also includes: a resource allocation schedule search/update unit (307) for setting the content of the coordinated reservation type network resource allocation, and a resource allocation schedule database (308a); a resource allocation execution unit (308) for issuing to a router as a router control command the setting of the reservation type network resource allocation having a reservation described therein and the setting of the coordinated immediate type network resource allocation; a charging management unit (309) for performing necessary processing when fee charging occurs for the allocated resource; and a network configuration information updating unit (311) for periodically verifying and updating the contents of the network path information database (305a) and the resource allocation status database (306a).

The other organization path information providing functional unit (320) has: an other organization resource allocation request preprocessing unit (306) for performing preprocessing to allocate resource to other organizations; and an inter-organization resource allocation unit (310) which exchanges, with other organizations, the operation policy of its organization necessary for inter-organization communication, references the exchanged operation policy and, for communication with other organizations, requests a network resource allocation to other organizations or accepts the requests from other organizations.

In this configuration, stored in the operation policy database (302a) are an intra-organization resource policy table (321a), an out-of-organization host policy table (321b), an organization-related policy table (321d), a user-related policy table (321e), and an inter-organization resource policy table (322a). The network path information database (305a) stores an inter-organization link management table (321c).

The network administrator generates the inter-organization resource policy table (322a) as shown in FIG. 6.

As shown in the figure, the inter-organization resource policy table (322a) has entries for each outgoing interface of the border router of its organization. In each entry, (a) denotes organization IDs (50101) of other organizations to which the outgoing interfaces connect; (b) denotes policy server addresses of other organizations to which the outgoing interfaces connect; (c) denotes inter-organization link IDs (50103) given to the outgoing interfaces, i.e., given to inter-organization links; (d-1) is IP addresses (50104) of the incoming interfaces of the same border routers that correspond to the outgoing interfaces; (d-2) is IP addresses (50105) of the outgoing interfaces; (e) is IP addresses (50106) of the outgoing interfaces of the border routers of other organizations that connect to the outgoing interfaces; (f) denotes upper limit (M bits/sec) of the band of the outgoing interface available for each host that is set by the network administrator for the reservation type resource allocation request; and (g) is an upper limit (M bits/sec) of the band of the outgoing interface available for each host that is set by the network administrator for the immediate type resource allocation request. The network administrator generates the inter-organization link management table (321c) as shown in FIG. 7. As shown, the inter-organization link management table (321c) shows to which organization the inter-organization link of organization A is connected. The table describes, for each inter-organization link, (a) inter-organization link ID (50301) and (b) organization ID (50302) of other organization connected by the inter-organization link of the inter-organization link ID. For each customer host that is permitted the inter-organization communication, the network administrator registers the following with the intra-organization resource policy table (321a):

(1) IP addresses of those hosts in a local organization which are permitted to communicate with other organizations;

(2) Inter-organization link IDs of the inter-organization links that the local organization has;

(3) Upper limits of the bands that the hosts of (1) can use in the communications via the inter-organization link IDs of (2) when each of the reservation type and the immediate type resource allocation requests is made;

(4) Organization IDs of the organizations with which the hosts of (1) are allowed to have inter-organization communication; and (5) Paths in the local organization that are assigned the upper limits of (3).

The following items are registered for each outgoing interface of the border router:

(1) IP address of the outgoing interface;

(2) Inter-organization link IDs of the inter-organization links that the local organization has;

(3) Upper limits of the bands that can be used by the communications directed toward the inter-organization links of (2) through the outgoing interface of (1) when each of the reservation type and the immediate type resource allocation requests is made; and (4) Paths in the local organization that are assigned the upper limits of (3).

More specifically, the intra-organization resource policy table (321a) is generated as shown in FIG. 8.

Figures 9, 10:
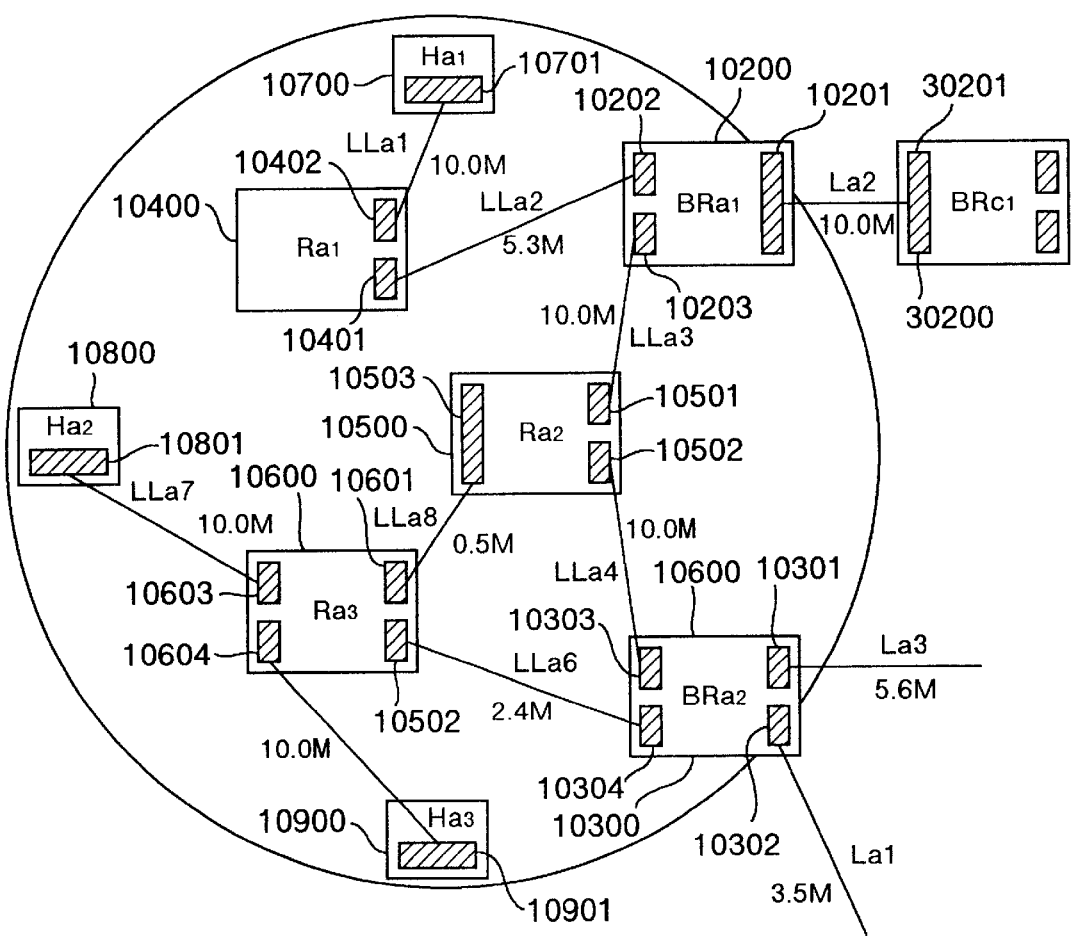
FIG. 9 is a diagram showing example settings of upper limits of bands for links in the organization.
FIG. 10 is a diagram showing an inter-organization link management table for a policy server of organization B.

In the table, (a) describes IP addresses (50201) of the hosts or outgoing interface IP addresses of the border routers in the organization that are permitted an inter-organization communication. In this example, it shows IP addresses of the hosts Ha1 (10700), Ha2 (10800), Ha3 (10900) and three outgoing interface IP addresses of the border routers BRa1 and BRa2 in the organization A. (b) describes inter-organization links ID from the organization A to other organizations. Entered in (c-1) are upper limits of the band that the hosts or the outgoing interfaces of the border routers can use in the communication via the inter-organization link IDs of (b) in response to the reservation type requests. (c-2) describes upper limits (M bits/sec) of the band that the hosts or the outgoing interfaces of the border routers can use in the communication via the inter-organization link IDs of (b) in response to the immediate type requests. (d) describes with which organizations each host is allowed to make inter-organization communication. (e) describes intra-organization paths for which the upper limits of (c-2) have been determined. Now, the network administrator determines the upper limits of bands of (c-1) and (c-2) and the paths of (e), as follows. Here, we will explain an example case of the band upper limit for the reservation type allocation. Suppose, as shown in FIG. 9, a network administrator has set in each communication link within the organization an upper limit of the band that each host can use for the reservation type allocation. The upper limits of the bands that each host can use for the reservation type allocation through the inter-organization links are the values set in the inter-organization resource policy table (322a) of FIG. 6. The host Ha1 (10700) in the organization A and the router Ra1 (10400) in the same organization are connected by a physical link (LLa1) through their interfaces 10701 and 10402, with the band upper limit for reservation type allocation available for each host set at 10.0 (M bits/sec). The router Ra1 (10400) in the organization A and the border router BRa1 (10200) in the same organization are connected by a physical path (LLa2) through their interfaces 10401 and 10202, with the band upper limit for reservation type allocation available for each host set at 5.3 (M bits/sec). The border router BRa1 (10200) in the organization A and the border router BRc1 (30200) in the organization C are connected by a physical path (La2) through their interfaces 10201 and 30201, with the band upper limit for reservation type allocation available for each host set at 10.0 (M bits/sec). Hence, when the host Ha1 (10700) is to be serviced using the reservation type allocation from other organization through the link La2, because the potentially available band conforms to the least value of the bands described above, the upper limit of the band for the reservation type allocation is 5.3 (M bits/sec). The path has links LLa1, LLa2 and La2.

When the host Ha1 (10700) is to be serviced using the reservation type allocation from other organization through the link La3, the available links are LLa1, LLa2, LLa3, LLa4 and La3. The router Ra 1 (10400) in the organization A and the border router BRa1 (10200) in the same organization are linked by a physical link (LLa2) through their interfaces 10401 and 10202, with the band upper limit for reservation type allocation available for each host in the link LLa2 set at 5.3 (M bits/sec), which is the smallest of the links. Hence, when the host Ha1 (10700) is to be serviced from other organization through the link La3, the potentially available band for the reservation type allocation has an upper limit of 5.3 (M bits/sec). The path has links LLa1, LLa2, LLa3, LLa4 and La3. Another path reaching the host Ha1 through the link La3 may take a link LLa8, but this path, because it further reduces the upper limit to 0.5 (M bits/sec), is not adopted.

When the host Ha1 (10700) is to be serviced using the reservation type allocation from other organization through the links La1, La2, the same processing as described above is also performed. When the host Ha3 (10900) is to be serviced through the link La1 or La2, a band upper limit and a path are determined in the same way. The network administrator sets the organization-related policy table (321d) and the user-related policy table (321e). In the organization-related policy table (321d), the network administrator describes, for each of other organizations that are permitted to use the local organization, upper limits of the bands in this organization that the other organizations are allowed to use; time zones during which the other organizations are permitted to use the bands of this organization; paths within this organization that the other organizations are permitted to use in communications passing through this organization (paths are each identified by a combination of links LLa in FIG. 9); in what way the other organizations are charged for the use of this organization; and in what order of priority the resource allocation requests from other organizations are to be processed. In the user-related policy table (321e), the network administrator describes, for each user in this organization, the upper limits of bands the users are allowed to use, the time zones available for the users, in what priority order the resource allocation requests from the users are to be processed, and so on. In the user-related policy table (321e), however, the band upper limits and the time zones available for the users and the order of priority in which the resource allocation requests from the users are to be processed may be specified for each group of users. Having set the inter-organization link management table (321c) in the network path information database (305a), the inter-organization resource policy table (321a) in the operation policy database (302a), the organization-related policy table (321d), the user-related policy table (321e), and the inter-organization resource policy table (322a), the network administrator now starts the operation of the policy server. Once the policy server is started, the inter-organization resource allocation unit (310) exchanges the inter-organization link management table (321c) with other policy servers to update the inter-organization link management table (321c). This processing is explained as follows. Suppose the policy server of organization A, when it is started, has the inter-organization link management table (321c) of FIG. 7 set by the network administrator. It is also assumed that the policy servers of organizations B, C, D are already in operation. At this point the policy server of organization B has an inter-organization link management table shown in FIG. 10. That is, because the policy server of organization A was not operating, the policy server of organization B has the inter-organization link management table indicating only that the inter-organization link Lb1 is connected to the organization C (organization ID number 64514) and the inter-organization link Lb2 to the organization D (organization ID number 64515). At this point the policy server of organization C maintains an inter-organization link management table shown in FIG. 11. That is, because the policy server of organization A was not operating, the policy server of organization C has the inter-organization link management table indicating only that the inter-organization link Lc1 is connected to the organization B (organization ID number 64513) and also connected through the organization B to the organization D (organization ID number 64515). At this point, the policy server of organization D maintains an inter-organization link management table shown in FIG. 12. That is, because the policy server of organization A was not operating, the policy server of organization D has the inter-organization link management table indicating only that the inter-organization link Ld1 is connected to the organization B (organization ID number 64513) and also connected through the organization B to the organization C (organization ID number 64514). When the policy server of organization A is started, it is supplied with the contents of the inter-organization link management tables from the adjoining organizations (organizations B and C). The policy server of organization A adds the contents of the received inter-organization link management tables into the entries where the organization IDs of the organizations that have forwarded the inter-organization link management tables are registered, thereby reflecting them on its inter-organization link management table (321c) as shown in FIG. 13. As a result, the policy server of organization A (10100) is now able to know, from the inter-organization link management table (321c), which organization it can reach through which inter-organization link. After this, the exchange of the inter-organization link management tables among the policy servers are repeated as required. Conversely, the content of the inter-organization link management table (321c) made public by the organization A is successively propagated to other organizations, so that the information indicating through which inter-organization link the organization A can be reached is added to the inter-organization link management table of each policy server. Once started, the policy server makes public and distributes the policy of its organization described in the intra-organization resource policy table (321a) so that the information on those hosts in its organization that are permitted to communicate with other organizations can be registered in the out-of-organization host policy table (321b) by the policy servers of the other organizations with which the hosts are permitted to communicate. In more concrete terms, for each of the hosts whose IP addresses are registered in the intra-organization resource policy table (321a), the policy server sends a message over the inter-organization links connected to the local organization. Each of the messages sent over the inter-organization links includes the following information:

(1) IP address of the host;
(2) Organization IDs of the other organizations with which the host registered in the intra-organization resource policy table (321a) is permitted to communicate;
(3) Path information indicating the inter-organization links through which the message is sent; and
(4) Band upper limits for the reservation type allocation and the immediate type allocation that are registered in the intra-organization resource policy table (321a) for each of the message carrying inter-organization links.

Figure 14:
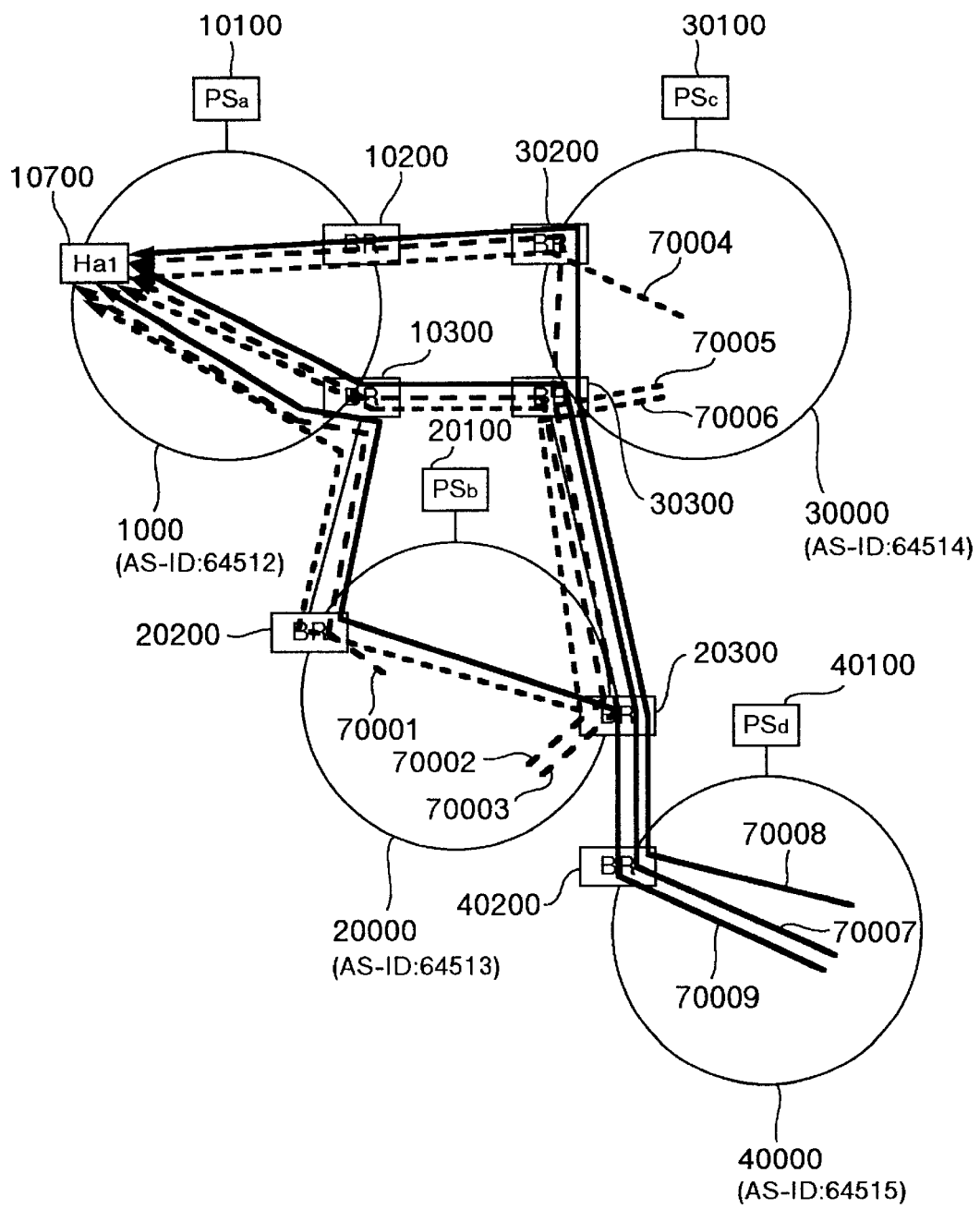
FIG. 14 is a diagram showing paths along which a message is distributed to make the policy public.
Figure 15:
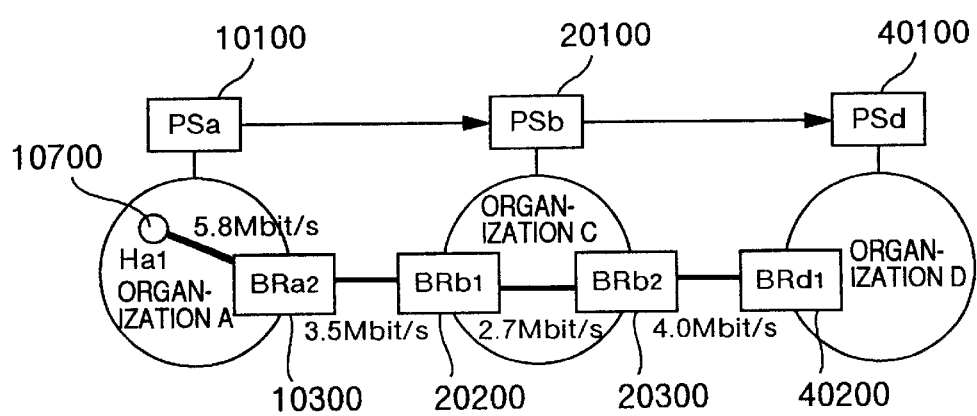
FIG. 15 is a diagram showing how to determine band upper limits for the links leading up to the hosts of other organizations.

The host messages transmitted over the inter-organization links are successively propagated from one organization to another and are finally received by each of the policy servers of the other organizations with which the hosts are permitted to communicate. This is realized as follows. The policy server of each of the other organizations transfers the messages received from one of the inter-organization links connected thereto to all the other inter-organization links, i.e., all the host messages are sent out over each of the links. When it receives the message that it received in the past, the policy server discards it. The same transfer or relay operation is carried out by the policy server of each of the other organizations with which the hosts are permitted to communicate. For example, when the other organizations with which the host Ha1 "192. 16. 12. 100/24" (10700) of organization A is permitted to communicate are the organizations B, C, D, as shown in FIG. 14, the three same host messages that were transmitted by the policy server one over each of the inter-organization links arrive at policy servers of the organizations B, C, D through three different paths. When the policy server of each of the other organizations B, C, D, with which the host Ha1 is permitted to communicate, relays the message received through one of the inter-organization links connected thereto to all the remaining inter-organization links, the policy server adds to the message the path information on both the inter-organization link that has received the message and the inter-organization link that transmits the message, or path information on only the message sending inter-organization link. Further, the policy server of each of the other organizations B, C, D determines, for the reservation type and immediate type allocations, the upper limit of the band available in the link from its message sending inter-organization link to the message-originating host Ha1 and adds the band upper limit to the message. The upper limit is determined for each of the reservation and immediate types as shown in FIG. 15.

Let us take an example path of BRd1 (40200)<BRb2 (20300)<BRb1 (20200)<BRa2 (10300)<Ha1, connecting the bottom router to the top router in FIG. 14. In this case, the message the policy server PSb (2100) receives from the policy server PSa (10100) includes the information that the upper limit of the band available for the host Ha1 (10700) in the inter-organization link between the BRb1 (20200) and BRa2 (10300) is 3.5 (M bits/sec). The policy server PSb (20100) determines which of two band upper limits is smaller, the band upper limit available in the link between a message sending border router BRb2 (20300) and a message receiving border router BRb1 (20200) or the band upper limit added last to the message received from the policy server PSa (10100) (in this case, 3.5 M bits/sec first set by PSa). The policy server PSb (20100) uses the smaller one as a band upper limit to be added to the relay message which it will send out from BRb2 (20300). The band upper limit available in the link between the message sending border router BRb2 (20300) and the message receiving border router BRb1 (20200) uses the value registered in the intra-organization resource policy table which corresponds to the path between the outgoing interfaces of the two border routers (i.e., the intra-organization link connecting one outgoing interface and the other outgoing interface). This case refers to the intra-organization band information (available band: 2.7 (M bits/sec)) and thus the band upper limit of 2.7 (M bits/sec) is added to the message which the policy server PSb (20100) sends out from the message sending border router BRb2 (20300). Similarly, the policy server in each organization compares the band upper limit last added to the message it received with the band upper limit in the path between the message receiving outgoing interface and the message sending outgoing interface, and adds whichever is smaller to the message before sending the message out.

As a result, the message that has reached a certain organization has added thereto the minimum values of the band upper limits for all segments of the inter-organization path that the message has traveled and which will be used when a communication from the organization that received the message to the message-originating host takes place, the band upper limits being set by the policy server of each of the organizations covering the segments of the path. In other words, the message has last added thereto the band upper limit that can be guaranteed for the inter-organization path that the message has traveled and which will be used by a communication from the organization that received the message to the message-originating host. The policy server that has received the message from the host, which is permitted to enter into an inter-organization communication with the policy server's organization, registers in the out-of-organization host policy table (321b) the band upper limits for the reservation type and immediate type allocations that were last added to the received message and all path information added to the received message, i.e., information on the inter-organization path traveled by the message. FIG. 16 shows entries associated with the host Ha1 of the organization A which are registered in the out-of-organization host policy table (321b) in the policy server of organization D. As shown in the table, column (a) (50401) describes an IP address of the host Ha1 and (b) (50402) describes an ID of the organization to which the host Ha1 belongs. For the three received messages about the host Ha1, there are three sets of information each consisting of (c) to (h). Column (c) (50403) denotes the band upper limit (M bits/sec) for the reservation type allocation last added to the message. Column (d) (50404) denotes the band upper limit (M bits/sec) for the immediate type allocation last added to the message (not shown in the figure). Column (e) (50405) denotes an IP address of an incoming path interface of the border router of the local organization that has received the host message. Column (f) (50406) denotes an IP address of an outgoing path interface of the border router of the local organization that has received the host message. Column (g) (50407) denotes IDs of the organizations that need to be passed through to reach the host of (a) in the order of passing. Column (h) denotes inter-organization path information indicating all path information added to the message. FIG. 15 shows the communication path from the organization D to the host Ha1, as specified by the out-of-organization host policy table (321b) in the policy server of organization D of FIG. 16, and the band upper limits for the reservation type allocation. As shown in FIG. 14, for path 1: BRd1 (40200)>BRb2 (20300)>BRc2 (30300)>BRa2 (10300)>Ha1, the band is limited to 4.0M (bits/sec) in the link between BRd1 (40200) and BRb2 (20300) and thus the band upper limit in this path for the reservation type allocation is 4.0M (bits/sec). For path 2: BRd1 (40200)>BRb2 (20300)>BRc2 (30300)>BRc1 (30200)>BRa1 (10200) >Ha1, because the band is limited to 1.3M (bits/sec) in the network inside the organization C, the band upper limit in this path for the reservation type allocation is 1.3M (bits/sec). For path 3: BRd1 (40200)>BRb2 (20300)>BRb1 (20200)>BRa2 (10300)>Ha1, because the band is limited to 2.7M (bits/sec) in the network inside the organization B, the band upper limit in this path for the reservation type allocation is 2.7M (bits/sec). When the policy server of organization A starts its operation, the policy is made public and the information on the hosts of organization A that are permitted to communicate with other organizations is registered in the out-of-organization host policy tables (321b) of the other organizations. The policy servers of organization A and other organizations repetitively make their policies public as required when they detect the starting of a new policy server or when their policies are changed. As a result, the policy server of each organization has registered therein the information on the hosts of all other organizations that are permitted to perform inter-organization communication with its organization.

One example of the message used for making such a policy public is shown.

Here we take up an example of UPDATE message of BGP4 (Border Gateway Protocol Version 4). The BGP4 is originally intended for the transmission of routing information. In this embodiment, the BGP4 is attached with QoS policy information and transferred. The BGP with such an extended function is hereinafter called a policy distribution protocol.

FIG. 17 shows a message format of QoS attribute. The QoS attribute information is added to the protocol each time it passes through an organization. With this information, the policy server of each organization can retrieve all bandwidths that are expected to be available between the IDs of organizations that are passed through and the IP address of a destination organization, and can also retrieve path information. A host IP net mask (11) and a host IP (10) are written with an IP address of a message-originating host. An AS-ID (50501) denotes an ID of an organization to which the policy server publicizing its policy belongs. A BR-IP net mask (50502) and a BR-IP (50503) are written with an address of a border router that has sent the message. This address can be used as the path information. An upper limit band available for reservation type allocation (50504) denotes an upper limit of a band available for the reservation type allocation. An upper limit band available for immediate type allocation (50505) denotes an upper limit of a band available for the immediate type allocation. A publicizing organization number (50510) and a publicizing organization (50511–50513) denote the number of organizations and the organization IDs in 50206 of the intra-organization resource policy table. Only when the policy server belonging to the organization corresponding to this organization ID receives the QoS attribute information, does it describes the information in the out-of-organization host policy table of FIG. 16.

FIG. 18(a) shows the QoS attribute information that is to be transmitted from the policy server PS of the organization A to the policy server PS of organization B. Here, it is shown that the border router that can be used to reach Ha1 (10700) is a border router BRa2 (10300) of organization A and that the available band (for reservation type allocation) is 3.5 (M bits/sec). FIG. 18(b) shows the QoS attribute information added which is to be transmitted from the policy server PS of the organization B to the policy server PS of organization D (50600). Here it is shown that the border router that can be used to reach Ha1 (10700) is a border router BRb2 (20300) of organization B and that the available band (for reservation type allocation) is 2.7 (M bits/sec). When the out-of-organization host policy table (321b) is prepared in this way, the policy server performs the resource allocation processing according to the network resource allocation request. The resource allocation processing includes reservation type resource allocation processing and immediate type resource allocation processing. Let us now explain about the reservation type resource allocation processing.

Figure 19:
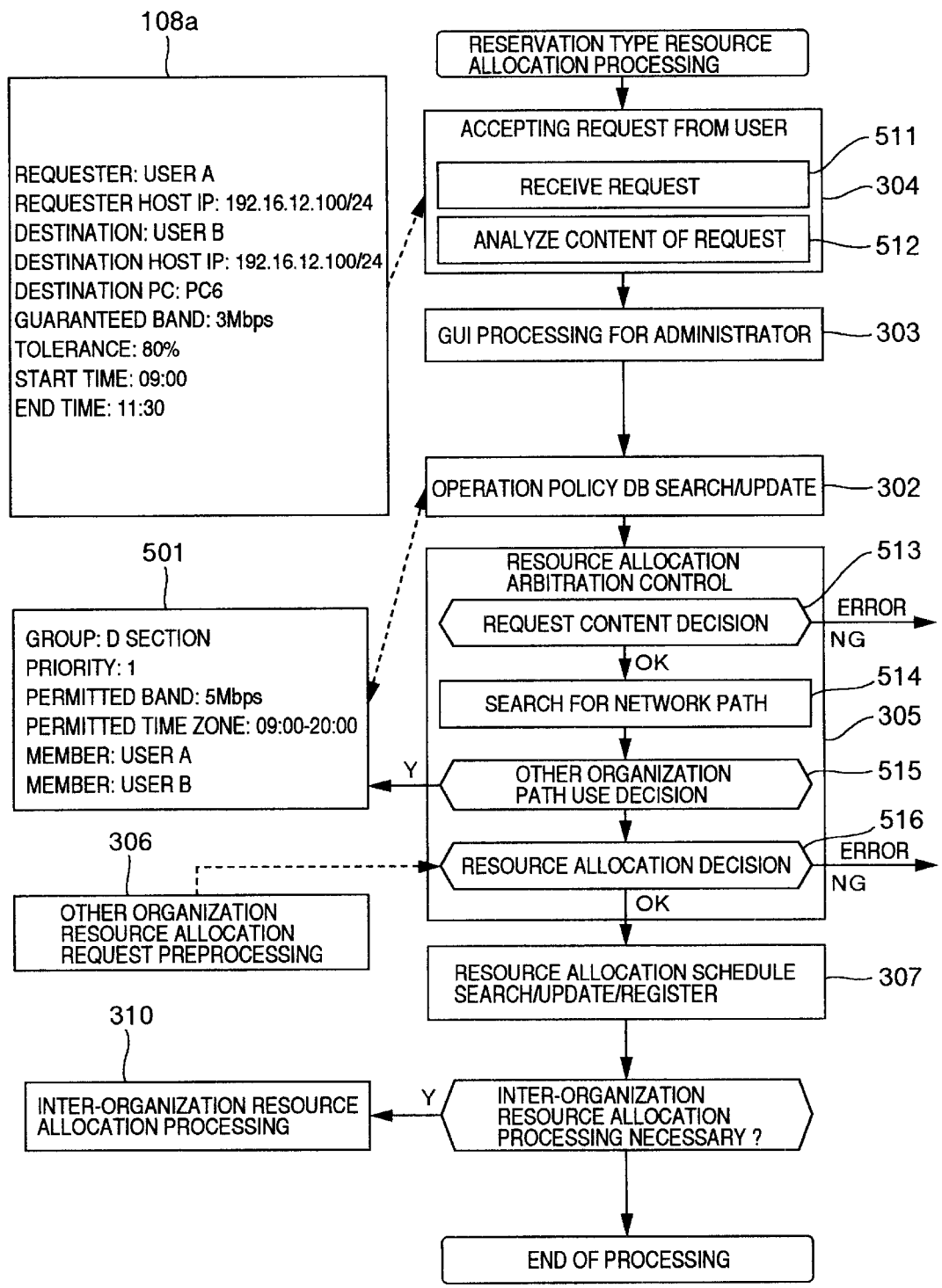
FIG. 19 is a flow chart showing a procedure of resource allocation processing for reservation type allocation.

FIG. 19 shows the procedure of the reservation type resource allocation processing. The reservation type resource allocation processing is started by accepting a network resource allocation request from the network administrator or user as a resource allocation request that specifies a future time zone. First, the request accepting unit (304) for accepting a resource allocation request from the user invokes request content reception processing (511) to receive the request from the network administrator or user which contains such information as source of resource allocation request, end points requesting resource allocation, content of resource allocation, and period of resource allocation, as exemplified in a reservation type network resource allocation request (108a). The request accepting unit (304) then invokes request content analyzing processing (512) to sort and analyze the content. When the resource allocation request from the user is directly notified to the network administrator, not via the network, the administrator GUI unit (303) enables the network administrator to enter the user request. When the network administrator makes special settings to individual resource allocation requests, the administrator GUI unit (303) is used. Next, the operation policy search/update unit (302) verifies the resource allocation request from the user by searching through the operation policy database (302a), with the requesting user as a key, for the content of the policy in the user-related policy table (321e) associated with the requesting user. The result of search represents a policy set for the requesting user, like the one shown in an example (501) in which a policy is set for a user group. Next, the resource allocation arbitration control unit (305) performs the following steps. The request content decision processing (513) checks a resource allocation request (108a) from the user against the content of the policy associated with user which is registered in the user-related policy table (321e) to see whether the request meets the requirement of the policy. If the request falls within the range of the policy, the network path search processing (514) determines the range of the network path that requires the resource allocation, based on the host IP at the far end of the path. Then, based on the network path information database (305a) containing the information on the paths connecting to other organizations, the other organization path use decision processing (515) checks whether the range of the searched path is closed within the network of the local organization and thereby decides whether it is necessary to transfer the resource allocation request to other organizations. When the path-to-other-organization use decision processing (515) has found it necessary to use paths to other organizations, the other organization resource allocation request preprocessing unit (306) performs the preprocessing for requesting the resource allocation request to other organizations.

Figure 20:
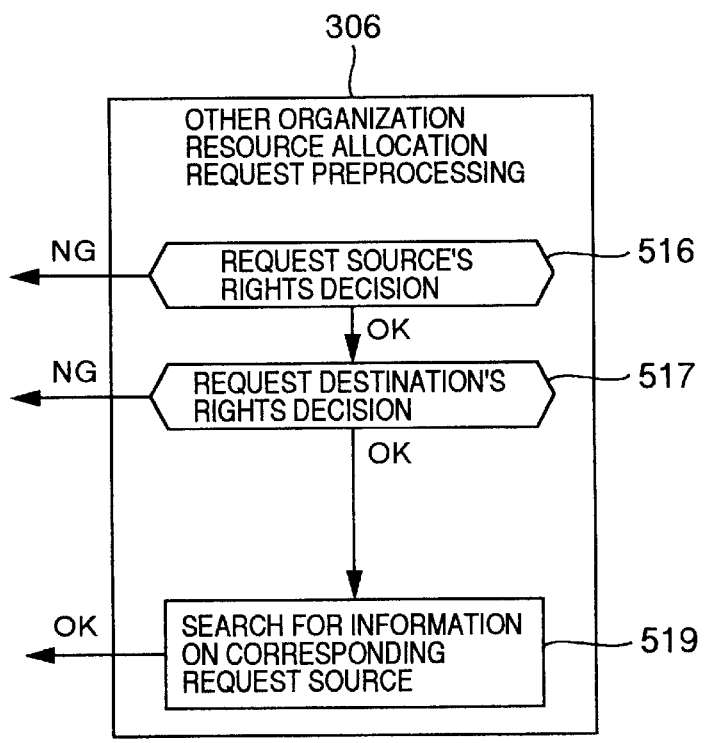
FIG. 20 is a flow chart showing a preprocessing procedure.

FIG. 20 shows the processing performed by the preprocessing unit (306). This processing references the information on the requesting host in the intra-organization resource policy table of FIG. 8 to check whether the destination host's organization is one of the other organizations with which the requesting host is permitted to communicate and whether the requested band meets one of the band upper limit requirements registered for each inter-organization link (step 516). When these requirements are satisfied, the question of whether the destination host is allowed to have an inter-organization communication with the organization of the requesting host is checked by looking up the out-of-organization host policy table (321b) of FIG. 16 to see if the destination host is registered in it. Further, the band upper limits are registered in the out-of-organization host policy table (321b) for each path associated with the destination host. A check is made to see if there is any path which contains the inter-organization links in the intra-organization resource policy table that have the band upper limits satisfying the requested band (517). Then if the above requirements are all met, candidate intra-organization links whose band upper limits satisfy the requirements are selected from the information registered for the requesting host on an inter-organization link basis in the intra-organization resource policy table, and candidate intra-organization paths satisfying the requirements of the band upper limits and including the candidate inter-organization links are selected from the information registered for the destination host in the out-of-organization host policy table (321b). One intra-organization path information and corresponding path information are selected from the candidates and transferred to the resource allocation decision processing (516).

To describe more specifically, suppose the requesting host is A and the destination host is B. Also suppose, for the requesting host A, the organization of the destination host B and the band upper limits for the link 1, link 2 and link 3 are registered in the intra-organization resource policy table. If the registered band upper limits for the link 1 and link 3 are equal to or more than the requested band, then the link 1 and link 3 are taken as candidates. Next, suppose the destination host B is registered in the out-of-organization host policy table; and also suppose, for the destination host B, paths 10 and 11 including the candidate link 1 and paths 13 and 14 including the candidate link 3 are registered. If the registered band upper limits for the path 10 including the link 1, for the path 13 including the link 3 and for the path 14 including the link 3 are equal to or more than requested band, then a pair of link 1 and path 10, a pair of link 3 and path 13, and a pair of link 3 and path 14 are taken as candidates. Then, one of these pairs is selected. If, for example, the selected pair is a pair of link 3 and path 13, the following information is transferred to the resource allocation decision processing (516): the intra-organization path information registered in the intra-organization resource policy table in association with the link 3 contained in the selected pair and with the requesting host A and also the path information registered in the out-of-organization host policy table (321b) in association with the path 13 and with the destination host B.

Now, returning to FIG. 19, the resource allocation decision processing (516) determines the content of the resource to be allocated. That is, the resource allocation request preprocessing unit (306) determines the content of resource allocation on a path according to the received intra-organization path information to ensure that the path will have a requested band in a requested time zone. Then, the unit checks the resource allocation schedule database (308a) to see if the resource allocation as determined above can be reserved. If the reservation is possible, the resource allocation schedule search/update unit (307) processes the determined intra-organization resource allocation into a policy object in a form that allows the resource allocation function to be implemented and then registers the policy object. Then, the resource allocation execution unit (308) interprets the registered policy object according to the intra-organization resource allocation schedule and, by using the protocol such as SNMP and COPS, sends a control command requesting the execution of the determined resource allocation to the routers on the path described in the policy object. Upon receiving the control command, the routers allocate resources to the network paths.

Figure 21:
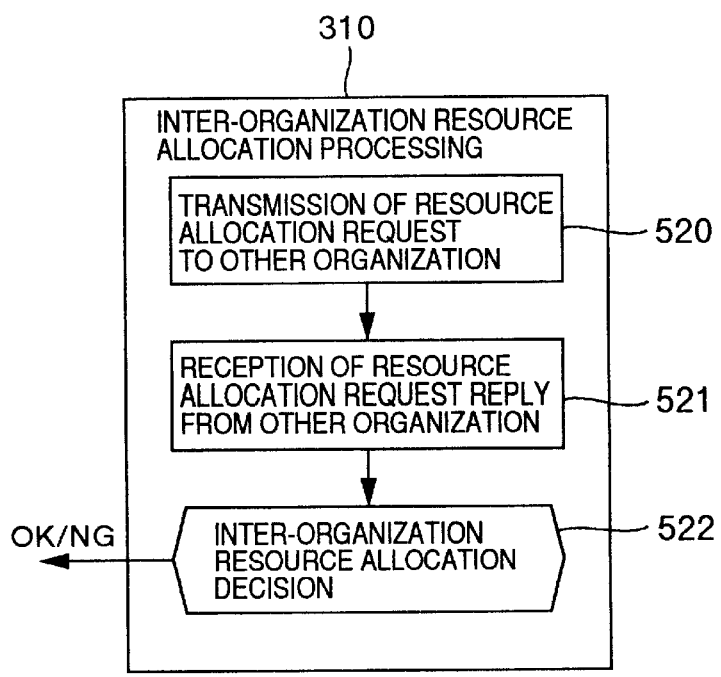
FIG. 21 is a flow chart showing processing performed by an inter-organization resource allocation unit for reservation type allocation.

When the resource allocation request preprocessing unit (306) performs preprocessing for resource allocation to other organizations, the inter-organization resource allocation unit (310) is invoked. FIG. 21 shows the processing performed by the inter-organization resource allocation unit (310). Because at this point the resource within the local organization has already been secured, this processing sends a resource allocation request to other organizations (520) together with the path information received from the resource allocation request preprocessing unit (306) to request the policy server of other organization, which is next to the local organization on the path indicated by the path information, to perform the resource allocation in that organization. Then, the other organization that received the resource allocation request sends returns to the requesting organization a report on whether the resource allocation request was successfully executed or failed (521). The returned report is checked by the inter-organization resource allocation decision processing (522). When a report indicating a successful execution of the resource allocation request is returned, the reservation of the inter-organization resource allocation is completed.

Figure 22:
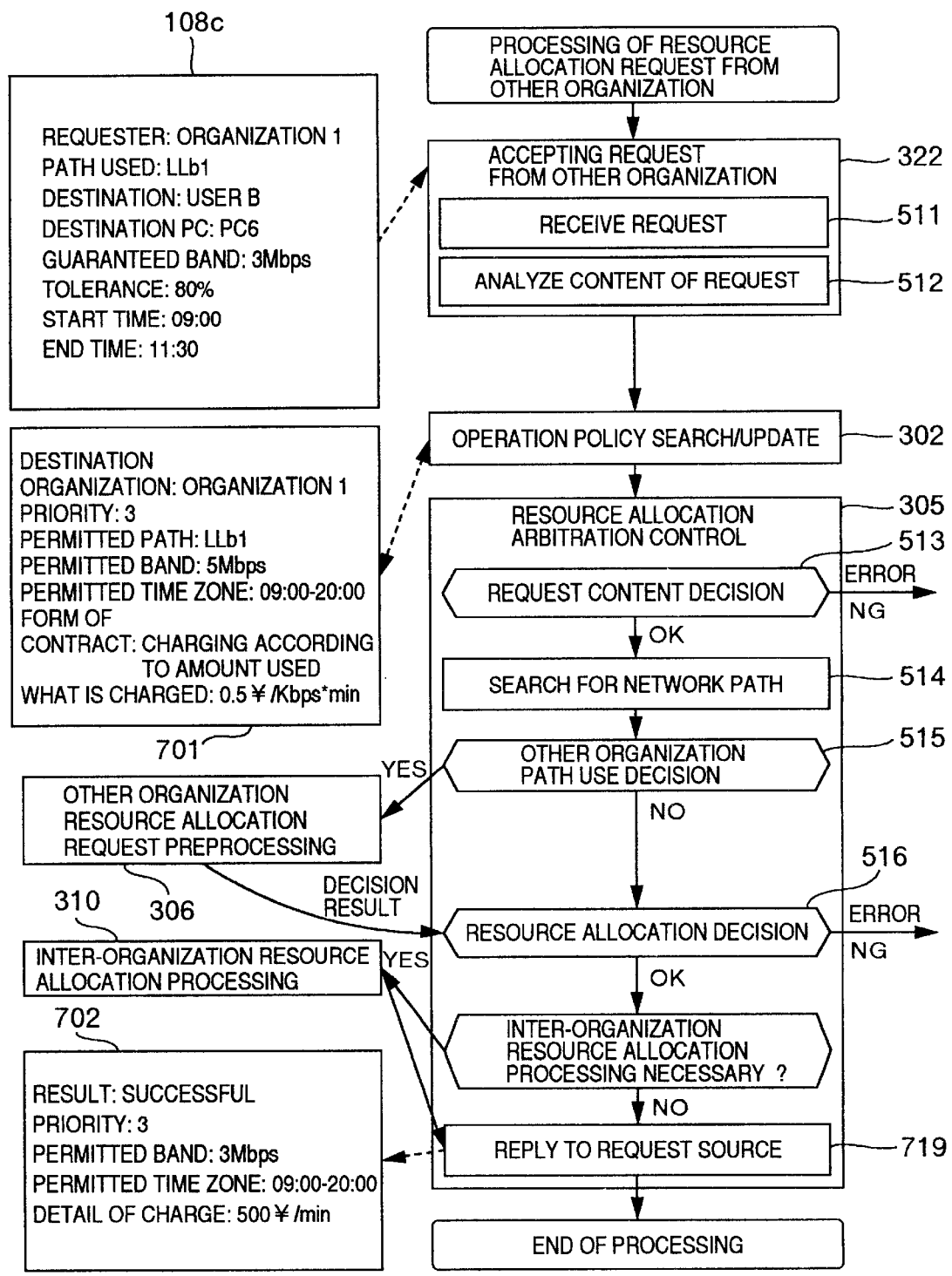
FIG. 22 is a flow chart showing resource allocation processing for reservation type allocation.

Next, the processing performed by the policy server when it receives a resource allocation request from a policy server of other organization will be explained. FIG. 22 shows the sequence of steps carried out by the policy server when it receives a resource allocation request from a policy server of other organization. This processing is started when the network resource allocation request from other organization is accepted. The request accepting unit (322) invokes the request content reception processing (511) to receive a request, as exemplified in the network resource allocation request (108c), from other organization and then invokes the request content analyzing processing (512) to break down, analyze and sort out the content of the received request. The resource allocation request from other organization is issued with the request source taken as a request issuing organization. Next, the operation policy search/update unit (302) searches through the organization-related policy table for the policy associated with the request source. The policy to be found includes the content as shown in the example (701). The other organization resource allocation arbitration control unit (305) checks whether the resource allocation request (108c) from other organization meets the requirements of the searched policy (701). When the requirements are satisfied and if the request is within the range of the policy, the network path search processing (514) searches through the network path information database (305a) to determine the range of the network path that needs the resource allocation. Then, the other organization path use decision processing (515) checks, based on the information from the destination host IP (321c), whether the range of the searched path is closed within the network of the local organization and decides whether a resource allocation request needs to be transferred to the other organization. When it is found necessary to use the path of the other organization, the other organization path use decision processing (515) starts the other organization resource allocation request preprocessing unit (306) to perform the preprocessing for making a resource allocation request to the other organization. Based on the path information accompanying the request, the preprocessing searches through the intra-organization resource policy table for a registered intra-organization path connecting two inter-organization links (two outgoing interfaces) that are connected to the local organization and hands the retrieved information over to the request acceptance decision processing (817). The resource allocation decision processing (516), when the preprocessing is not performed, searches through the intra-organization resource policy table for a registered intra-organization path between the inter-organization link, which connect to the local organization as indicated by the path information accompanying the request, and the destination host, and then determines the resource allocation on the path according to the received intra-organization path information so that a path having the requested band in the requested time zone and conforming to the retrieved intra-organization path information can be secured. When the preprocessing has been performed, the resource allocation decision processing (516) determines the resource allocation on the path according to the received intra-organization path information to secure the path that has the requested band in the requested time zone and conforming to the intra-organization path information transferred from the preprocessing. After this, the resource allocation decision processing (516) checks the resource allocation schedule database (308a) to see if the resource allocation as determined above can be reserved. When the reservation is found possible, the resource allocation schedule search/update unit (307) is started. These processing is similar to those explained by referring to FIG. 19.

The inter-organization resource allocation unit (310), if the processing of the other organization resource allocation request preprocessing unit (306) has been executed, sends a resource allocation request also to the next policy server on the path information accompanying the received resource allocation request. Then, when the inter-organization resource allocation unit (310) receives a reply from the next policy server indicating a successful execution of the resource allocation request sent to the next policy server, it notifies the successful execution of the resource allocation request to the former policy server on the path information (the source that has issued the resource allocation request).

The processing of the reservation type resource allocation has been described.

The inter-organization resource allocation processing described above can use what is called a policy negotiation protocol, which is obtained by extending the signaling protocol COPS (Common Open Policy Service). The COPS is a policy signaling protocol that is defined by the IETF (Internet Engineering Task Force) and provides a mechanism allowing equipment such as policy servers and routers to exchange the network policies (for example, QoS policy). When the COPS is used, the equipment such as policy server that determines and specifies the policy is called a PDP (Policy Decision Point) and the equipment such as router that receives the directions from the PDP and performs control in compliance with the policy is called a PEP (Policy Enforcement Point). The policy negotiation protocol makes the policy server on the resource allocation requesting side behave as the PDP and the policy server on the request responding side behave as the PEP. The "negotiation" denotes jobs of making the resource allocation request and of responding to the request. The word negotiation will be used in the following explanations.

Figure 23:
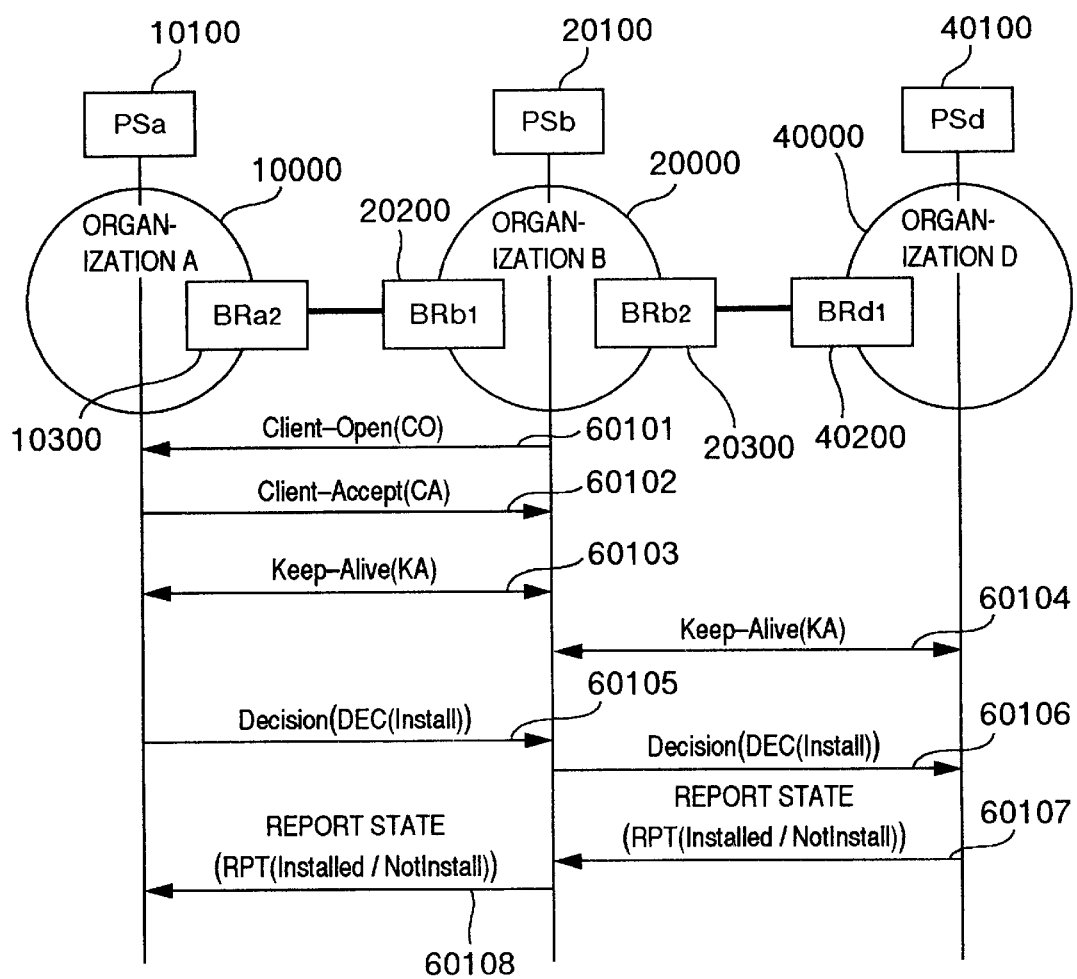
FIG. 23 is a sequence diagram showing an outline of a policy negotiation protocol.

FIG. 23 is a sequence diagram showing the outline of the policy negotiation protocol. This protocol assumes that the control extends over different organizations. In response to a user in organization A requesting the reservation type allocation or immediate type allocation between it and a user in organization D, the policy server (10100) of organization A is shown to be negotiating with the policy server (40100) of organization D through the policy server (20100) of organization B. The fundamental sequence of policy negotiation between two policy servers is as follows. In implementing the policy negotiation protocol, a session for policy negotiation protocol is established. In the organizations whose network administrators have agreed in advance to negotiate between them and which are interconnected by physical circuits, when the policy servers start their operation, the session is established by the PEP side policy server sending a Client-Open (CO) message (60101) and by the PDP side policy server receiving the Client-Accept (CA) message (60102). When the policy servers can be both PDP and PEP, they perform both the CO message sending and the CA message sending. In that case, two sessions are established between the organizations but only one session may be used for negotiation. The state of the session between the organizations is periodically checked by using a Keep-Alive (KA) message (60103, 60104) between the policy servers. When a negotiating event occurs, the PDP side policy server (here, policy server (10100) of organization A) sends a Decision (DEC (Install)) message (60105) carrying the negotiation content to the PEP side policy server (policy server (20100) of organization B). The policy server of the responding side organization attempts to make reservation for the resource in the organization, checks whether or not the QoS guaranteed path can be established, and returns a Report State (RPT (Install)) message (60108) carrying the information on success or failure of the negotiation in response to the DEC message.

Next, the negotiation sequence among three policy servers of organizations A, B, D based on the above fundamental negotiation sequence between two policy servers is explained as follows.

The PDP side policy server sends a DEC (Install) message (60105) carrying the content of negotiation to a PEP side policy server, the policy server of the next organization on the inter-organization path (in this case, organization B) to which the PDP side policy server makes a resource allocation request. Upon receiving the DEC (Install) message, the PEP policy server checks the content of negotiation and attempts to allocate the resource inside its own organization. When it has found that the resource allocation is possible, the PEP policy server now acts as a PDP and sends a DEC (Install) message (60106) carrying the similar negotiation content to a PEP side policy server of the next organization on the inter-organization path (in this case, organization D) to which the second PDP policy server makes a resource allocation request. If its own organization is not the last of the organizations on the inter-organization path of which the resource allocation is requested, the PEP side policy server behaves the same way as described above. When, however, its organization is the last one and if the resource allocation within the organization is possible, the PEP side policy server returns a PRT (Installed/NotInstalled) message (60107) carrying the information on the success or failure of the negotiation to the policy server on the PDP side with respect to itself, which in turn returns a PRT (Installed/NotInstalled) message (60108) carrying the information on the success or failure of the negotiation to the policy server on the PDP side with respect to itself.

The embodiment of the present invention has been described.

According to this embodiment, in a network system having a plurality of networks each provided with a policy server, the QoS control using a policy of the policy servers can be performed on the communications extending to different networks. For the communications covering multiple networks, the QoS control can be carried out not to violate the policy of each policy server of the networks through which the communications travel.

Although in the above embodiment a static policy is made public for use in the QoS control, it is possible to publicize, for use in the QoS control, the policy that dynamically changes according to the state of resource allocation. In the above embodiment, the policy on the band upper limits of the intra-organization links and inter-organization links is set for the communication of each host. It is also possible to use a policy that does not consider the number of hosts and which directly sets the band upper limits for the intra-organization links and the inter-organization links.

While the above embodiment has explained the policy made public for use in the QoS control as the policy on the transmission band, the policy publicized for use in the QoS control may be other policies that concern other resources.

While the present invention has been described in detail and pictorially in the accompanying drawings, it is not limited to such details since many changes and modifications recognizable to those of ordinary skill in the art may be made to the invention without departing from the true spirit and the scope thereof.

What is claimed is:

1. A network system having a plurality of interconnected networks each having a policy server, the policy server setting a quality-guaranteed path in the network according to a policy held in the policy server, the policy server comprising:

a policy holding unit to hold a policy defining a quality that can be guaranteed in its own network, or local network, for an inter-network communication;

a policy publicizing unit to make public the policy held in the policy holding unit to the policy servers of other networks;

a guaranteed quality calculation unit to calculate, from a policy publicized by a policy server of a network on a path between the local network and other network, a quality that can be guaranteed for the path between the local network and the other network; and a quality-guaranteed path setting unit to provide a quality-guaranteed path, the quality-guaranteed path having a guaranteed quality within the quality calculated by the guaranteed quality calculation unit for the path between the local network and the other network.

2. A network system having a plurality of interconnected networks each having a plurality of hosts and a policy server, the policy server setting a quality-guaranteed path in the network according to a policy held in the policy server, the policy server comprising:

a policy holding unit to hold a policy defining a quality that can be guaranteed in its own network, or local network, for a communication between each host and other network and a quality that can be guaranteed in the local network for a communication between other networks;

a policy publicizing unit to make public the policy held in the policy holding unit to the policy servers of other networks;

a guaranteed quality calculation unit to calculate from two qualities a quality that can be guaranteed for a path between a host of the local network and a host of other network, one of the two qualities being determined from a policy made public by a policy server of a network on the path between the host of the local network and the host of the other network, the one quality being able to be guaranteed for the path between the hosts of the local network and the other network, the other of the two qualities being determined by the policy held in the policy holding means, the other quality being able to be guaranteed in the local network for a communication between the host of the local network and the other network; and a quality-guaranteed path setting unit to provide a quality-guaranteed path, the quality-guaranteed path having a guaranteed quality within the quality calculated by the guaranteed quality calculation means for the path between the host of the local network and the host of the other network.

3. A network system according to claim 2, wherein the guaranteed quality calculation unit calculates qualities that can be guaranteed for paths between the local network and the other networks, and the quality-guaranteed path setting unit, when it receives from the host of the local network a request for a quality-guaranteed path with a specified quality, provides a quality-guaranteed path which is guaranteed the specified quality and which has a quality calculated by the guaranteed quality calculation unit as being higher than the specified quality.

4. A network system according to claim 2, wherein
the guaranteed quality calculation unit calculates qualities that can be guaranteed for paths between the host of the local network and the hosts of the other networks, and
the quality-guaranteed path setting unit, when it receives from the host of the local network a request for a quality-guaranteed path with a specified quality, provides a quality-guaranteed path which is guaranteed the specified quality and which has a quality calculated by the guaranteed quality calculation unit as being higher than the specified quality.

5. A network system according to claim 4, wherein
the quality-guaranteed path setting unit has:
  a unit to allocate to the quality-guaranteed path extending through the local network as much resource of the local network as is required by the quality level guaranteed for the quality-guaranteed path;
  a unit to request the policy server of the other network, through which the quality-guaranteed path to be provided extends, to allocate to the quality-guaranteed path as much resource of the other network as is required by the quality guaranteed for the quality-guaranteed path; and
  a unit to allocate the resource of the local network requested by the policy server of the other network to the quality-guaranteed path for which the resource allocation is requested.

6. A network system according to claim 4, wherein
the quality-guaranteed path setting unit has:
  a unit to make a reservation for allocating to the quality-guaranteed path extending through the local network as much resource of the local network as is required by the quality level guaranteed for the quality-guaranteed path;
  a unit to request the policy server of the other network, through which the quality-guaranteed path to be provided extends, to make a reservation for allocating to the quality-guaranteed path as much resource of the other network as is required by the quality guaranteed for the quality-guaranteed path;
  a unit to make a reservation for allocating the resource of the local network requested by the policy server of the other network to the quality-guaranteed path for which the resource allocation is requested; and
  a unit to allocate the resource of the local network according to the set reservation.

7. A network system according to claim 5, wherein
the policy server has a resource management unit to manage a present resource allocation state, and
the quality-guaranteed path setting unit performs the resource allocation when the resource allocation is allowed by the present resource allocation state managed by the resource management unit.

8. A policy server for setting a quality-guaranteed path in a controlled network according to a policy held in the policy server, the policy server comprises:
  a policy holding unit to hold a policy defining a quality that can be guaranteed in the controlled network for a communication between the controlled network and other network connected to the controlled network;
  a policy publicizing unit to make public the policy held in the policy holding unit to the policy servers of other networks;
  a guaranteed quality calculation unit to calculate, from a policy publicized by a policy server of a network on a path between the controlled network and other network, a quality that can be guaranteed for the path between the controlled network and the other network; and
  a quality-guaranteed path setting unit to provide a quality-guaranteed path, the quality-guaranteed path having a guaranteed quality within the quality calculated by the guaranteed quality calculation unit for the path between the controlled network and the other network.

9. In a network system having a plurality of interconnected networks each having a policy server, the policy server setting a quality-guaranteed path in the network according to a policy held in the policy server, a method of guaranteeing a quality of a communication between the networks to provide a quality-guaranteed path between the networks, the method comprising the steps:
  for the policy server to hold a policy defining a quality that can be guaranteed in its own network, or local network, for an inter-network communication;
  for the policy server to make public the policy held in it to the policy servers of other networks;
  for the policy server to calculate, from a policy publicized by a policy server of a network on a path between the local network and other network, a quality that can be guaranteed for the path between the local network and the other network; and
  for the policy server to provide a quality-guaranteed path, the quality-guaranteed path having a guaranteed quality within the quality calculated for the path between the local network and the other network.

10. A storage medium storing a program to be read and executed by a computer, the program being designed to build up on the computer according to a policy held in a policy server the policy server that sets a quality-guaranteed path in a controlled network, the program also being designed to build up on the computer
  a policy holding unit to hold a policy defining a quality that can be guaranteed in the controlled network for a communication between the controlled network and other network connected to the controlled network;
  a policy publicizing unit to make public the policy held in the policy holding unit to the policy servers of other networks;
  a guaranteed quality calculation unit to calculate, from a policy publicized by a policy server of a network on a path between the controlled network and other network, a quality that can be guaranteed for the path between the controlled network and the other network; and
  a quality-guaranteed path setting unit to provide a quality-guaranteed path, the quality-guaranteed path having a guaranteed quality within the quality calculated by the guaranteed quality calculation unit for the path between the controlled network and the other network.

11. A policy server used in a network system, the network system having a plurality of interconnected networks each having a plurality of hosts and a policy server, the policy server setting a quality-guaranteed path in the network according to a policy held in the policy server, the policy server comprising:
  a policy holding unit to hold a policy defining a quality that can be guaranteed in a controlled network for a communication between a host in the controlled network and other network and a quality that can be guaranteed in the controlled network for a communication between other networks connected to the controlled network;

a policy publicizing unit to make public the policy held in the policy holding unit to the policy servers of other networks;

a guaranteed quality calculation unit to calculate from two qualities a quality that can be guaranteed for a path between a host of the controlled network and a host of other network, one of the two qualities being determined from a policy made public by a policy server of other network on the path established by the host of the controlled network, the one quality being able to be guaranteed for the path between the hosts of the controlled network and the other network, the other of the two qualities being determined by the policy held in the policy holding means, the other quality being able to be guaranteed in the controlled network for a communication between the host of the controlled network and the other network; and a quality-guaranteed path setting unit to provide a quality-guaranteed path, the quality-guaranteed path having a guaranteed quality within the quality calculated by the guaranteed quality calculation unit for the path between the host of the controlled network and the host of the other network.

12. A policy server according to claim 11, wherein the guaranteed quality calculation unit calculates qualities that can be guaranteed for paths between the controlled network and the other networks, and the quality-guaranteed path setting unit, when it receives from the host of the controlled network a request for a quality-guaranteed path with a specified quality, provides a quality-guaranteed path which is guaranteed the specified quality and which has a quality calculated by the guaranteed quality calculation unit as being higher than the specified quality.

13. A policy server according to claim 11, wherein the guaranteed quality calculation unit calculates qualities that can be guaranteed for paths between the host of the controlled network and the hosts of the other networks, and the quality-guaranteed path setting unit, when it receives from the host of the controlled network a request for a quality-guaranteed path with a specified quality, provides a quality-guaranteed path which is guaranteed the specified quality and which has a quality calculated by the guaranteed quality calculation unit as being higher than the specified quality.

14. A policy server according to claim 13, wherein the quality-guaranteed path setting unit has:

a unit to allocate to the quality-guaranteed path extending through the controlled network as much resource of the controlled network as is required by the quality level guaranteed for the quality-guaranteed path;

a unit to request the policy server of the other network, through which the quality-guaranteed path to be provided extends, to allocate to the quality-guaranteed path as much resource of the other network as is required by the quality guaranteed for the quality-guaranteed path; and a unit to allocate the resource of the controlled network requested by the policy server of the other network to the quality-guaranteed path for which the resource allocation is requested.

15. A policy server according to claim 13, wherein the quality-guaranteed path setting unit has:

a unit to make a reservation for allocating to the quality-guaranteed path extending through the local network as much resource of the controlled network as is required by the quality level guaranteed for the quality-guaranteed path;

a unit to request the policy server of the other network, through which the quality-guaranteed path to be provided extends, to make a reservation for allocating to the quality-guaranteed path as much resource of the other network as is required by the quality guaranteed for the quality-guaranteed path;

a unit to make a reservation for allocating the resource of the controlled network requested by the policy server of the other network to the quality-guaranteed path for which the resource allocation is requested; and a unit to allocate the resource of the controlled network according to the set reservation.

16. A policy server according to claim 14, wherein the policy server has a resource management unit to manage a present resource allocation state, and the quality-guaranteed path setting unit performs the resource allocation when the resource allocation is allowed by the present resource allocation state managed by the resource management unit.

* * * * *